May 22, 1934.  E. ZIPPER  1,959,754
VEHICLE WHEEL
Filed Nov. 9, 1929   2 Sheets-Sheet 1

E. Zipper INVENTOR
By: Marks & Clerk ATTYS.

May 22, 1934.                E. ZIPPER                 1,959,754
                           VEHICLE WHEEL
                   Filed Nov. 9, 1929      2 Sheets-Sheet 2
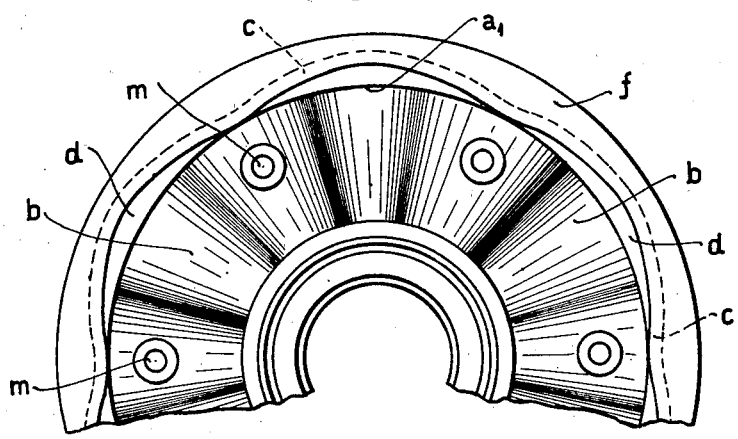
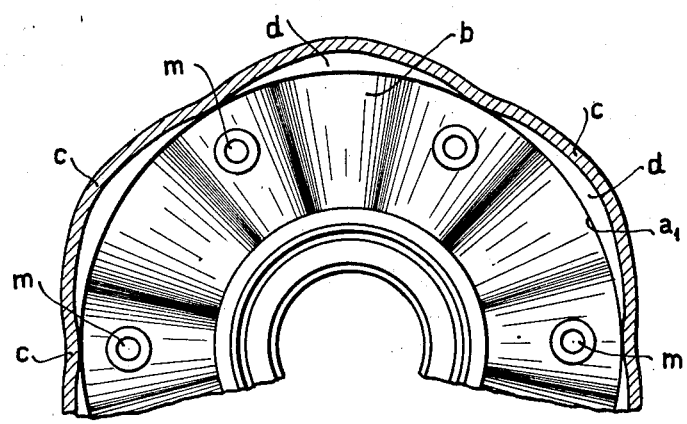
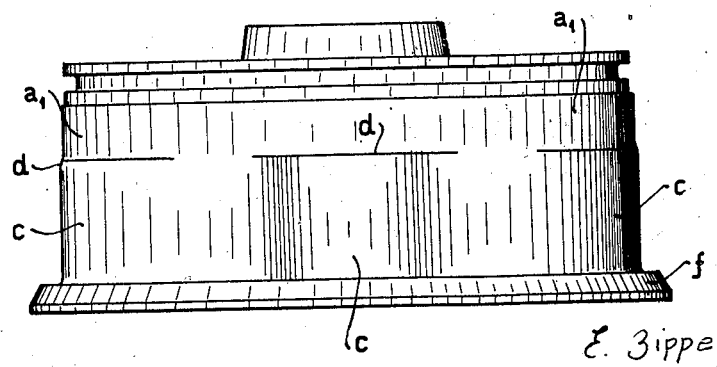

Patented May 22, 1934

1,959,754

UNITED STATES PATENT OFFICE 1,959,754

VEHICLE WHEEL

Emil Zipper, Vienna, Austria

Application November 9, 1929, Serial No. 406,125
In Austria November 13, 1928

4 Claims. (Cl. 301—65)

This invention relates to an improved wheel for motor vehicles and the like. One of the main objects striven for in connection with the application of pneumatic tyres to the wheels of motor vehicles, especially in the case of heavy lorries, is the use of tyres of the largest possible diameter. This implies on the one hand great breadth and on the other hand very small diameter of the rim of the wheel. It then follows that the diameter of the brake must be small also, and the need arises for increasing the breadth of the brake-blocks in the direction of the axle of the wheel in order to obtain the necessary extent of brake bearing-surface. Since however brakes of this type should as far as possible be housed within the wheel, it has become the usual practise to shift the position of the junction between the spokes or disc of the wheel and the rim towards the outside edge of the rim.

In the case of wheels made of cast steel or of wrought iron it is easy to provide the portion of the rim which projects beyond the disc or the spokes of the wheel and encloses the space for the brake drum with the necessary strength. When, however, for the sake of the reduction of weight, the wheel is made of a light metal, for instance of an aluminum alloy, the portion of the rim projecting beyond the disc or the spokes of the wheel would not have sufficient strength unless it were provided with supplementary stiffening or bracing. It has therefore been necessary in the case of light metal wheels either to abandon the one-sided supporting of the rim by the disc or spokes and to provide the disc of the wheel with corrugations of semi-circular cross-section occupying the entire breadth of the rim, or to stiffen the portion of the rim projecting beyond the disc or spokes by means of ribs disposed radially and tapering away towards the hub of the wheel. In the first-mentioned form of construction for light metal wheels it is completely impossible to house the brake-drum within the wheel, and wheels of this type can therefore only be used on the front axles of vehicles in the rare cases in which four-wheel brakes are dispensed with. The stiffening ribs implied by the second form of construction mentioned have the disadvantage of very much reducing the space available for the brake-drum. A further consideration of equal importance in connection with these wheels is that various difficulties arise in the course of the production of the wheels which lead to the turning out of a very high percentage of useless castings. In castings of all the known light metals aggregations of the material, unequal wall thicknesses, and above all rib-shaped and other excrescences prevent uniform cooling, with the result that strains are set up in the material and fine cracks may be produced, which impair the strength of the casting to a very great extent and lead, in the case of the wheels in question, to fracture of the wheels during the load tests.

The present invention provides a wheel for motor vehicles and the like which is capable of being cast in light metal, and in which not only a greater saving of weight is achieved than hitherto but the stiffening of the portion of the rim projecting beyond the disc or the spokes of the wheel is effected in a manner which enables all the above-named difficulties of production to be avoided, and also renders the whole of the space enclosed by the projecting portion of the rim available for the accommodation of the brake-drum. These advantages are achieved by the fact that, in accordance with the invention, only that portion of the rim which is supported by the one-sidedly disposed disc or spokes is cylindrical in shape, while the adjacent portion, which projects beyond the disc or the spokes is so shaped that a section thereof on a plane at right angles to the axis of the wheel follows an unbroken wavy or undulating line.

An example of the embodiment of the invention is shown in the drawings, in which:—

Fig. 5 is a view of the wheel from the side opposite that shown in Fig. 1.

Fig. 6 is a fragmentary section on the line 6—6 of Fig. 2.

Fig. 7 is a top plan view of the wheel.

Figure 1:
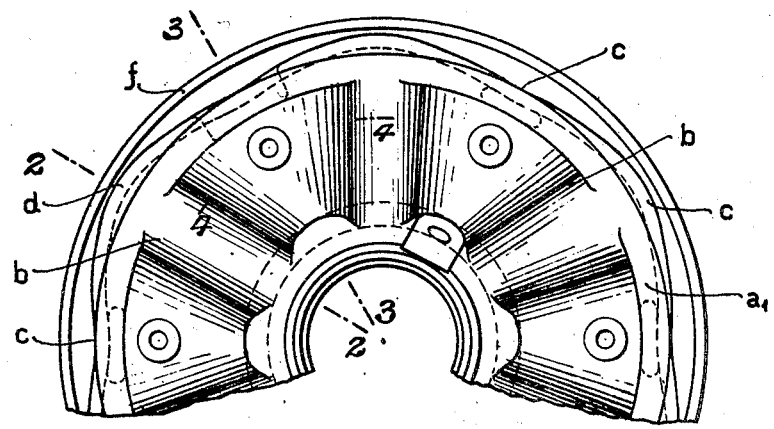
Fig. 1 is a side elevation of the improved wheel for motor vehicles as seen from the left to right of the sectional views shown in Figs. 2 and 3.
Figure 2:
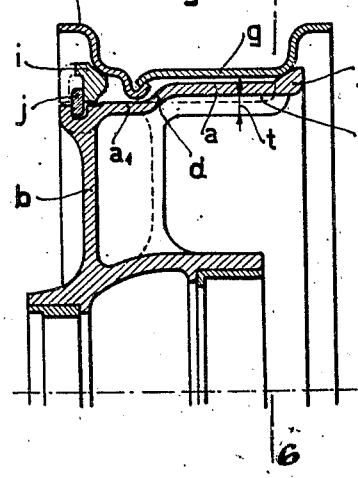
Fig. 2 is a section on the line 2—2 of Fig. 1, but showing the demountable rim, which latter is not illustrated in Fig. 1.
Figure 3:
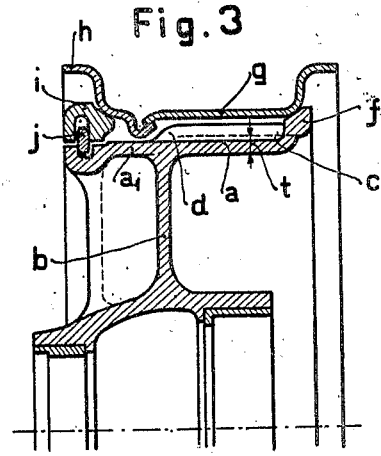
Fig. 3 is a section on the line 3—3 of Fig. 1 also showing the demountable rim in position.
Figure 4:
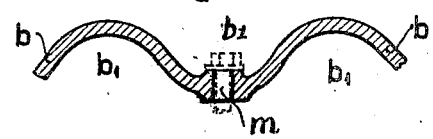
Fig. 4 is a section on the line 4—4 of Fig. 1.

As shown in Figs. 2 and 3, the rim of the wheel is not supported throughout its entire breadth by the disc of the wheel, but for less than half of its breadth only, so that the portion $a$ towards the middle of the vehicle projects beyond the disc of the wheel. The disc $b$ of the wheel is provided in the known manner with radially disposed corrugations $b_1$ (Fig. 4). The portion $a_1$ of the rim of the wheel into which the disc $b$ of the wheel merges and which is thus effectively stiffened is of the usual circular or cylindrical form. The projecting portion $a$ of the rim, however, which has to carry the loads resulting from the weight and velocity of the vehicle in the manner of a girder supported at one end only, is not circular or cylindrical but is provided with axially disposed corrugations $c$, so that its cross-section on a plane at right angles to the axis of the wheel follows a wavy or undulating line. At the same time the thickness of this portion $a$ of the rim is uniform throughout. These corrugations $c$ in the portion $a$ of the rim are, as shown in Fig. 1 of the drawings, very shallow and their depth $t$ (Figs. 2 and 3) is approximately equal to or slightly greater than the thickness of the rim of the wheel. The corrugations $c$ are connected along their outer edge by the flange $f$, which carries the detachable auxiliary rim $g$, and along their inner edge (where the portions $a$ and $a_1$ of the rim of the wheel merge) by the oblique portion $d$ of the rim.

The described manner of construction the portion $a$ of the rim of the wheel which projects beyond the disc $b$ or the spokes of the wheel eliminates all aggregations of metal, all ribs and all edges which could lead to faults in the casting. The corrugations $c$ strengthen the portion $a$ of the rim of the wheel to such an extent that the strength of the wheel is many times that of a wheel with a cylindrical rim of the same material and thickness. The transverse strength of a girder increases in proportion to the square of its height, and in the present case the height, which in ordinary circular wheel rims is equal to their thickness, is increased to the extent of the depth $t$ of the corrugations $c$. Moreover the corrugations $c$ have the effect of transferring the loads to which they are submitted by the weight and velocity of the vehicle in the manner of partial arches to the entire rim of the wheel and to the flange-shaped portions $d$ and $f$ of the rim. At least half of the breadth of the wheel is available for the accommodation of the brake-drum and further the total weight of the wheel is very considerably less than that of the hitherto known lorry-wheels cast in light metal.

The present invention offers particular advantages in connection with lorry-wheels of the type in which a detachable auxiliary rim $g$, $h$, divided on a plane at right angles to the axis of the wheel, is employed, as shown in Figs. 2 and 3 of the drawings. The portions $g$, $h$ of the auxiliary rim must be provided at their inner edges with flange-shaped extensions (Figs. 2 and 3) by means of which they can be connected together, and a ring-shaped space must be provided on the outside of the rim to accommodate these connecting members. According to the invention and as shown in Figs. 2 and 3, the corrugations $c$ extend inwards towards the hub of the wheel to such an extent that their ridges are on a level with, i. e. at the same distance from the centre of the hub as the cylindrical portion $a_1$ of the rim (Fig. 3), while they extend outwardly to such an extent that their ridges are situated further from the centre of the hub than the portion $a_1$ of the rim by the depth $t$ of the corrugations (Fig. 2). There thus remains in the outside surface of the portion $a_1$ of the rim which is supported by the disc $b$ of the wheel a space for the accommodation of the connecting pieces of the two portions $g$ and $h$ of the auxiliary rim, while a space is obtained within the freely projecting portion $a$ of the rim for the accommodation of the brake-drum, which is equal in diameter to the full internal diameter of the cylindrical portion $a_1$ of the rim of the wheel. The brake drum (not shown) is secured to the disc $b$ by means of screws extending through holes $m$ of the disc.

In the example of the embodiment of the invention shown in the drawings the portion $h$ of the auxiliary rim is split radially, so that its diameter can be increased and decreased. By the decreasing of the diameter of the portion $h$ of the auxiliary rim, the latter can be brought out of engagement with the portion $g$. The portion $h$ of the auxiliary rim is supported by a ring $i$, which is held in position by a locking ring $j$.

I declare that what I claim is:—

1. A vehicle wheel cast in one piece from an aluminum alloy or like light metal, comprising a web part, and a rim part carried by the outer portion of the web part, the portion of the rim part lying contiguous to the web part being of cylindrical form having a smooth periphery and the remaining portion of the rim part projecting laterally of and beyond the web part, said laterally projecting portion of the rim part being corrugated axially.

2. A vehicle wheel cast in one piece from an aluminum alloy or like light metal, comprising a web part, and a rim part carried by the outer portion of the web part, the portion of the rim part lying contiguous to the web part being of cylindrical form having a smooth periphery and the remaining portion of the rim part projecting laterally of and beyond the web part, said laterally projecting portion of the rim part being corrugated axially, the cylindrical portion of the rim part having a smaller external diameter than the mean external diameter of the laterally projecting portion of the rim.

3. A vehicle wheel cast in one piece from an aluminum alloy or like light metal, comprising a web part, and a rim part carried by the outer portion of the web part, the portion of the rim part lying contiguous to the web part being of cylindrical form having a smooth periphery and the remaining portion of the rim part projecting laterally of and beyond the web part, said laterally projecting portion of the rim part being corrugated axially and a flange at the edge of the laterally projecting portion of the rim part opposite the web part and forming a support for a demountable rim.

4. A vehicle wheel cast in one piece from an aluminum alloy or like light metal, comprising a web part, and a rim part carried by the outer portion of the web part, the portion of the rim part lying contiguous to the web part being of cylindrical form having a smooth periphery and the remaining portion of the rim part projecting laterally of and beyond the web part, said laterally projecting portion of the rim part being corrugated axially and a flange at the edge of the laterally projecting portion of the rim part opposite the web part and forming a support for a demountable rim, said flange being of substantially circular form and having a diameter greater than the mean diameter of said laterally projecting portion of the rim part.

EMIL ZIPPER.